United States Patent
Yamaguchi

(10) Patent No.: US 9,762,790 B2
(45) Date of Patent: Sep. 12, 2017

(54) IMAGE PICKUP APPARATUS USING EDGE DETECTION AND DISTANCE FOR FOCUS ASSIST

(71) Applicant: Panasonic Intellectual Property Management Co., Ltd., Osaka (JP)

(72) Inventor: Atsushi Yamaguchi, Osaka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 0 days.

(21) Appl. No.: 15/417,377

(22) Filed: Jan. 27, 2017

(65) Prior Publication Data

US 2017/0230568 A1 Aug. 10, 2017

(30) Foreign Application Priority Data

Feb. 9, 2016 (JP) .................................. 2016-022306
Oct. 25, 2016 (JP) .................................. 2016-208621

(51) Int. Cl.
*H04N 5/232* (2006.01)
*H04N 7/01* (2006.01)
*G02B 7/38* (2006.01)
*G06T 7/13* (2017.01)

(52) U.S. Cl.
CPC .......... *H04N 5/23212* (2013.01); *G02B 7/38* (2013.01); *G06T 7/13* (2017.01); *H04N 7/0135* (2013.01)

(58) Field of Classification Search
CPC .... H04N 5/23212; H04N 7/0135; G06T 7/13; G06T 7/38

USPC ....................... 348/345, 349, 333.02, 333.12
See application file for complete search history.

(56) References Cited

U.S. PATENT DOCUMENTS

| 2010/0157127 | A1* | 6/2010 | Takayanagi | ........ H04N 5/23293 |
| | | | | 348/333.02 |
| 2014/0232927 | A1* | 8/2014 | Kawai | ...................... G02B 7/36 |
| | | | | 348/347 |
| 2015/0138429 | A1* | 5/2015 | Ogura | ................ H04N 5/23212 |
| | | | | 348/349 |
| 2016/0028937 | A1* | 1/2016 | Motoda | .............. H04N 5/23212 |
| | | | | 348/349 |

FOREIGN PATENT DOCUMENTS

JP 2013-211757 10/2013

* cited by examiner

*Primary Examiner* — Nhan T Tran
(74) *Attorney, Agent, or Firm* — Renner Otto Boisselle & Sklar, LLP

(57) ABSTRACT

An image pickup apparatus is equipped with a distance information calculator, a high frequency signal extractor, a focus assist signal generator, and a signal synthesizer. The distance information calculator calculates distance information of a video signal and generates an in-focus range signal from current focus information and the distance information. The high frequency signal extractor extracts a high frequency signal of the video signal. The focus assist signal generator generates a focus assist signal representing a focused region by using the high frequency signal and the in-focus range signal. The signal synthesizer synthesizes the focus assist signal with the video signal to generate a focus-assist-signal-added video signal.

4 Claims, 12 Drawing Sheets

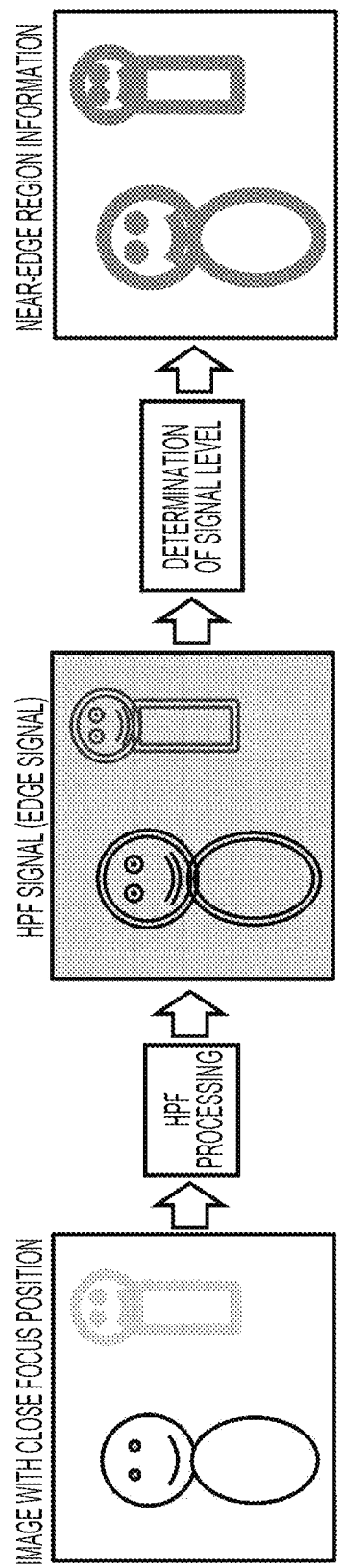

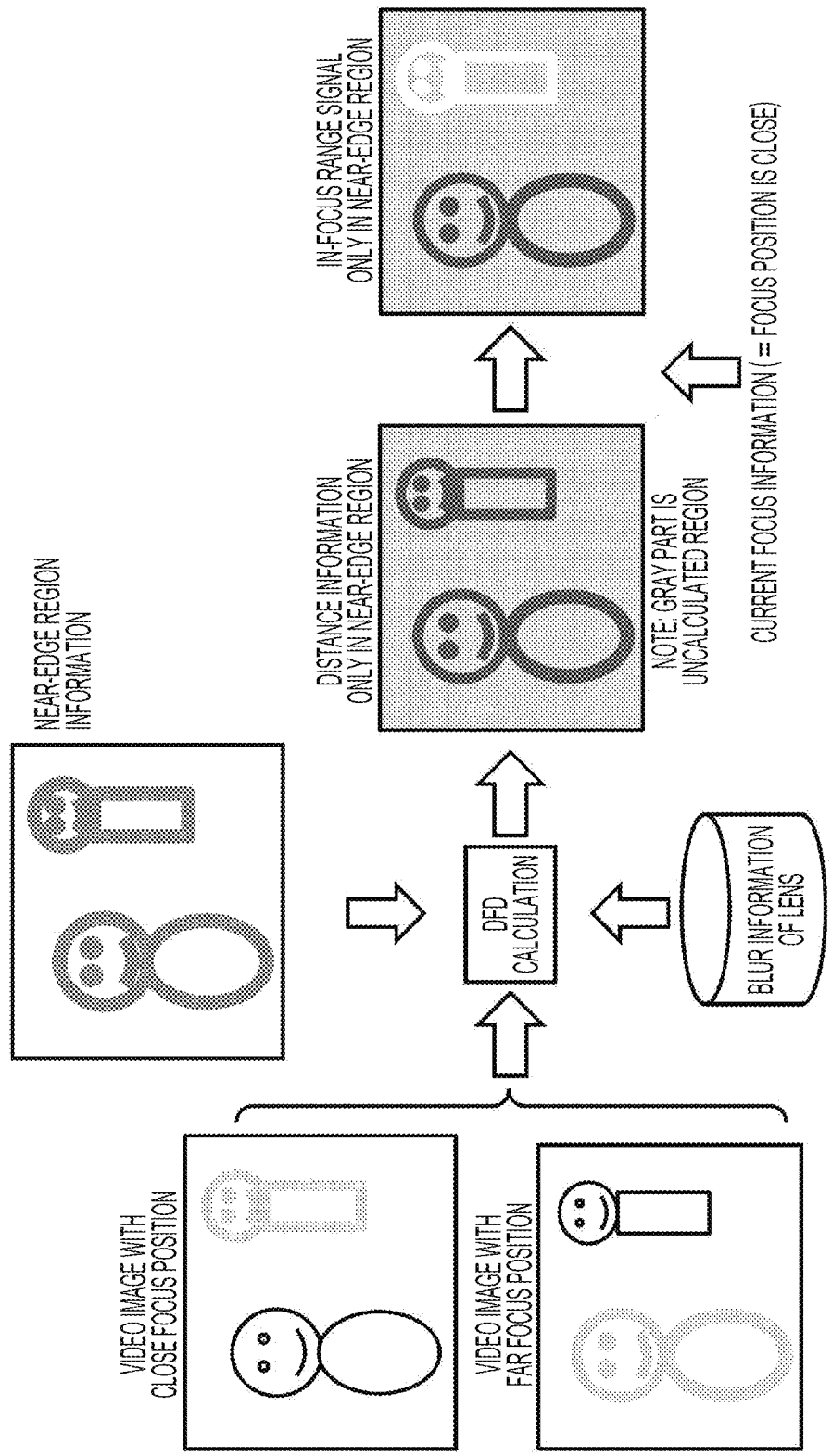

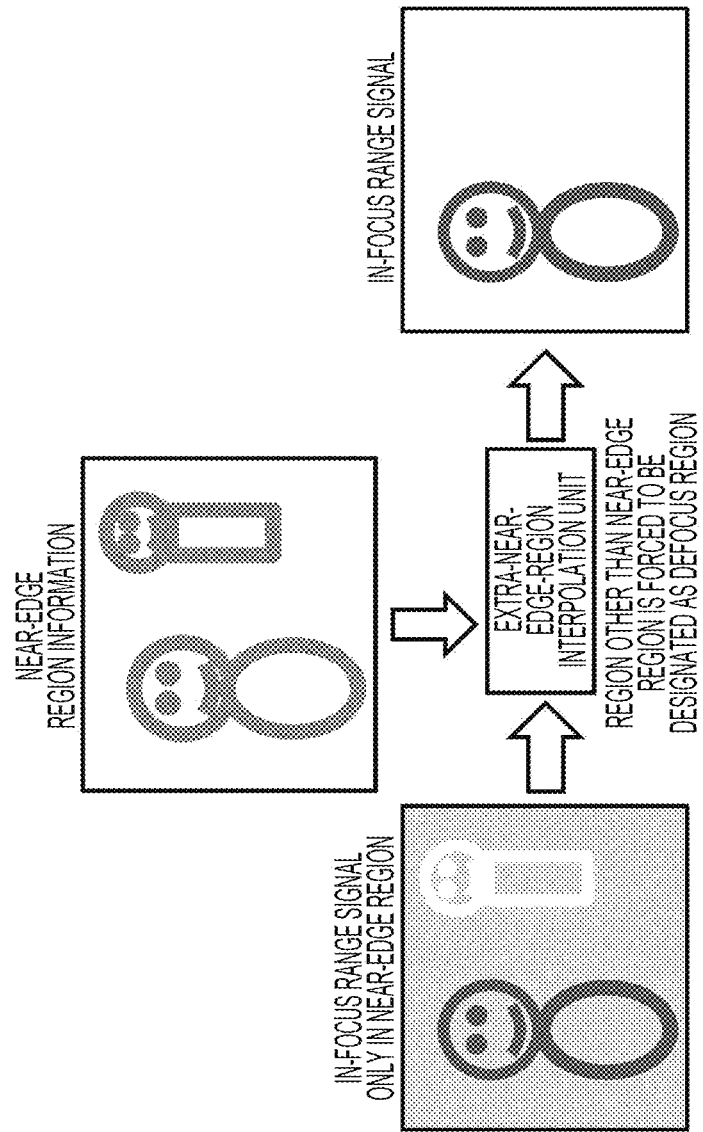

IMAGE PICKUP APPARATUS USING EDGE DETECTION AND DISTANCE FOR FOCUS ASSIST

BACKGROUND

1. Technical Field

The present disclosure relates to an image pickup apparatus with a focus assist function which makes it easy for a user to focus the image pickup apparatus when a manual focusing operation is being performed.

2. Description of the Related Art

In recent years, a depth of field of a lens has been becoming shallower with increase in image resolution such as 4K, increase in size of an imaging element, and the like. For this reason, a focusing operation by a manual focusing operation is becoming more difficult than ever.

PTL 1 discloses an image pickup apparatus in which edges are shown in colors corresponding to detected levels of edge in order of wavelength when a manual focusing operation is being performed. With this arrangement, colors change depending on how accurate the focusing is (degree of in-focus). Therefore, a user can visually recognize the degree of in-focus.

CITATION LIST

Patent Literature

PTL 1: Unexamined Japanese Patent Publication No. 2013-211757

SUMMARY

In an image pickup apparatus described in PTL 1, a high level of a detected edge is considered as an indication of being in focus, and in order to make it easy to visually recognize the level of the detected edge, a color of the edge is changed, depending on the level of the detected edge, in order of wavelength of color. However, if the level of the detected edge is used as an indication of being in focus, it is difficult to obtain an accurate focus assist signal in some cases because the level of the detected edge is largely affected by a pictorial pattern. Specifically, the magnitudes of levels of detected edges can be reversed between pictorial patterns one of which is capable of showing a sharp edge but is slightly blurred and the other of which is less capable of showing a sharp edge but is in focus; therefore, it is very difficult to recognize a degree of in-focus only by a detected edge level.

The present disclosure has been made to solve the above problem. The present disclosure provides an image pickup apparatus which can obtain an accurate focus assist signal by using a level of a detected edge and distance information.

An image pickup apparatus in the present disclosure is equipped with a distance information calculator, a high frequency signal extractor, a focus assist signal generator, and a signal synthesizer. The distance information calculator calculates distance information of a video signal and generates an in-focus range signal from current focus information and the distance information. The high frequency signal extractor extracts a high frequency signal of the video signal. The focus assist signal generator uses the high frequency signal and the in-focus range signal to generate a focus assist signal representing a focused region. The signal synthesizer synthesizes the focus assist signal with the video signal to generate a focus-assist-signal-added video signal.

An image pickup apparatus in the present disclosure is effective to obtain an accurate focus assist signal.

BRIEF DESCRIPTION OF THE DRAWINGS

FIG. 10 is a schematic diagram for describing an operation of determining a near-edge region in the image pickup apparatus in the third exemplary embodiment of the present disclosure;

FIG. 11 is a schematic diagram for describing an operation of calculating distance information only in a near-edge region in the image pickup apparatus in third exemplary embodiment of the present disclosure; and FIG. 12 is a schematic diagram for describing an operation of interpolating an in-focus range signal in a region other than the near-edge region in the image pickup apparatus in the third exemplary embodiment of the present disclosure.

DETAILED DESCRIPTION

Hereinafter, exemplary embodiments will be described in detail appropriately with reference to the drawings. However, an unnecessarily detailed description will not be given in some cases. For example, a detailed description of a well-known matter and a duplicated description of substantially the same configuration will be omitted in some cases. This is to prevent the following description from being unnecessarily redundant and thus to help those skilled in the art to easily understand the description.

Note that the accompanying drawings and the following description are provided to help those skilled in the art to sufficiently understand the present disclosure, and it is not intended for the drawings and the description to limit the subject claimed in the claims.

First Exemplary Embodiment

Hereinafter, a first exemplary embodiment will be described with reference to FIG. 1 to FIG. 5.

1-1. Configuration

Figure 1:
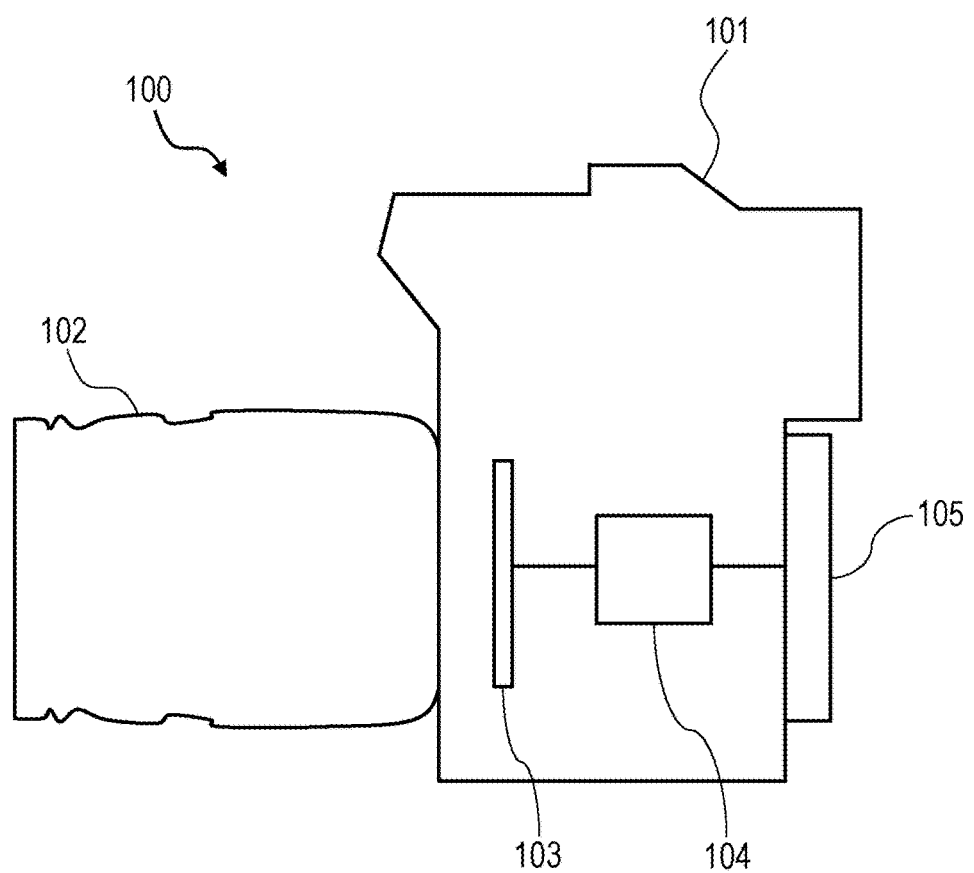
FIG. 1 is a block diagram showing a configuration of an image pickup apparatus in a first exemplary embodiment of the present disclosure.

FIG. 1 is a block diagram showing a configuration of an image pickup apparatus in the first exemplary embodiment of the present disclosure.

FIG. 1 is a block diagram showing a configuration of image pickup apparatus 100 in the first exemplary embodiment of the present disclosure. Image pickup apparatus 100 is equipped with lens barrel 102 and camera body 101. Lens barrel 102 is equipped with an optical system including a focusing lens and a zooming lens, an aperture stop, and the like, which are not shown in the drawing. Camera body 101 is equipped with image sensor 103, controller 104, and display 105.

Note that in the present exemplary embodiment, a description is given on a configuration in which image pickup apparatus 100 is integrally configured with lens barrel 102 and camera body 101; however, image pickup apparatus 100 may be an interchangeable lens type image pickup apparatus in which lens barrel 102 is configured with an interchangeable lens, and the interchangeable lens and the camera body may be separable.

Image sensor 103 images a subject image entering through lens barrel 102 and generates a video signal. Image sensor 103 is a CMOS (Complementary Metal Oxide Semiconductor) image sensor, a CCD (Charge Coupled Devices) image sensor, or the like. The generated video signal is subjected to various types of image processing on controller 104. The various types of image processing here are, for example, gamma correction processing, white balance correction processing, defect correction processing, YC (brightness, color-difference) conversion processing, electronic zoom processing, JPEG (Joint Photographic Experts Group) compression processing, and the like, but are not limited thereto. In addition to the above image processing, controller 104 controls whole image pickup apparatus 100. Controller 104 may be configured with a hard-wired electronic circuit or may be configured with a microcomputer using a program or other devices. Display 105 is disposed on a back surface of camera body 101. Display 105 displays an image represented by a video signal for display which has been processed on controller 104. Display 105 can selectively display a moving image and a still image. Other than images, display 105 can display a setting condition for whole image pickup apparatus 100. Display 105 is a liquid crystal monitor, an organic EL (electro-luminescence) monitor, or the like.

Figure 2:
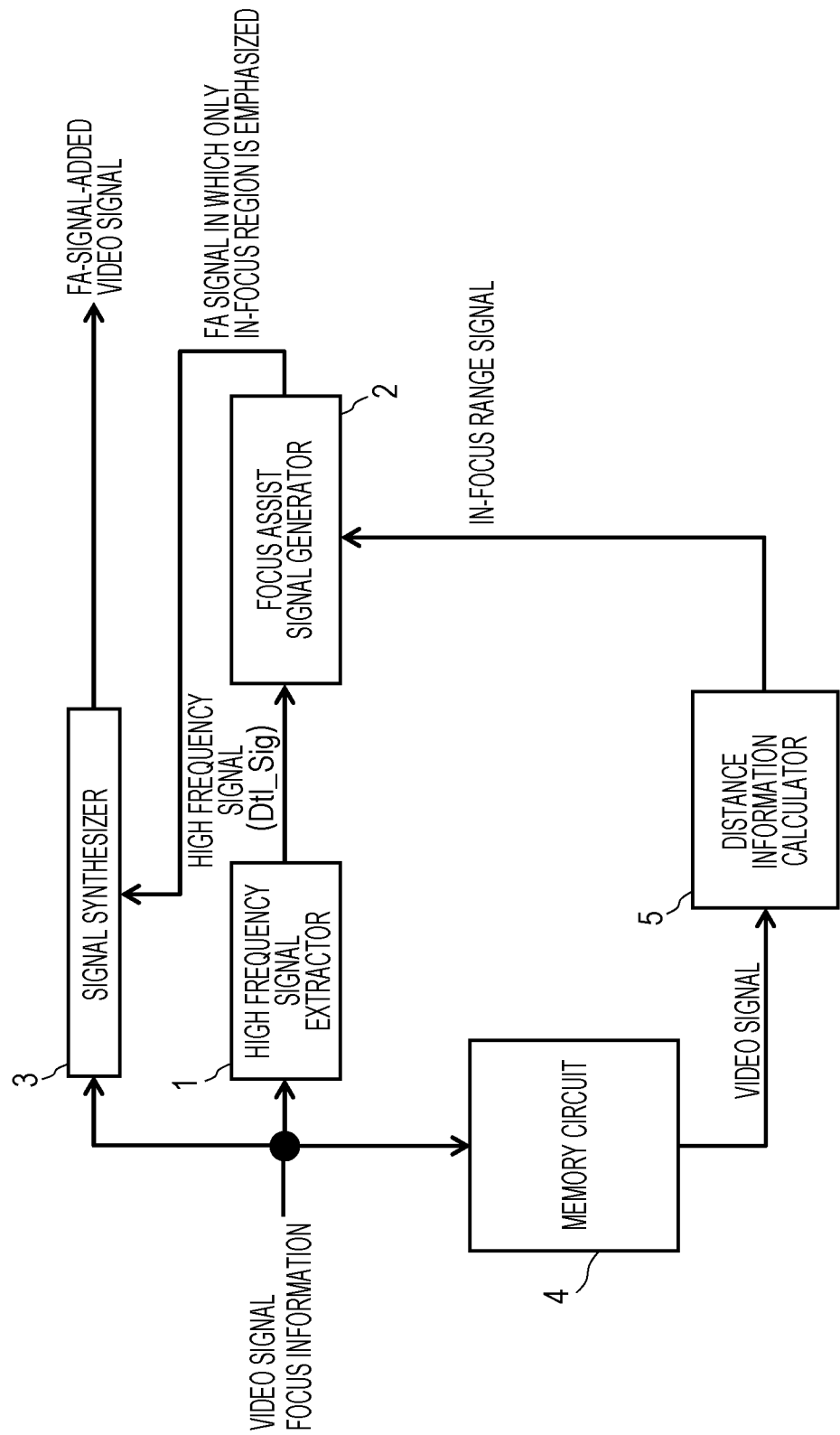
FIG. 2 is a block diagram showing image processing performed by a controller of the image pickup apparatus in the first exemplary embodiment of the present disclosure.

FIG. 2 is a block diagram showing image processing performed on controller 104 of image pickup apparatus 100 in the first exemplary embodiment of the present disclosure. Image pickup apparatus 100 is equipped with high frequency signal extractor 1, focus assist signal generator 2, signal synthesizer 3, memory circuit 4, and distance information calculator 5.

The inputs to the configuration block shown in FIG. 2 are video signals at different focus positions and focus information about a focusing operation, and the inputs are input by an operation, on an operation unit (not shown) of lens barrel 102, performed by a user.

High frequency signal extractor 1 extracts a high frequency signal of a video signal.

Distance information calculator 5 calculates distance information in each region of a video signal by using the DFD (Depth From Defocus) technology. The DFD technology is a technique in which by using two or more video signals at different focus positions, focus information for each of the video signals, and blur information of a lens, distance information in each region in the video signal is calculated on the basis of differences in how the video signals are blurred.

Memory circuit 4 stores two or more video signals at different focus positions and focus information which are necessary for calculation of distance information on distance information calculator 5.

Focus assist signal generator 2 uses the high frequency signal generated on high frequency signal extractor 1 and the in-focus range signal generated on distance information calculator 5 to generate a focus assist signal in which only a focused region is emphasized.

Signal synthesizer 3 synthesizes, with the original video signal, the focus assist signal which is generated on focus assist signal generator 2 and in which only the in-focus region is emphasized.

The video signal generated on signal synthesizer 3 is displayed on display 105.

1-2. Operation

A description will be given on an operation of image pickup apparatus 100 configured as described above. In order to make it easy to find a video image region in which a video signal is in focus, image pickup apparatus 100 outputs a focus-assist-signal-added video signal with which a focus assist signal for emphasizing only the video signal in the focused region is synthesized. For example, a video signal is output in which a red edge is synthesized only in a region in focus so that the focused video image region can be recognized at a glance. Hereinafter, respective operations will be described in detail.

Figure 3:
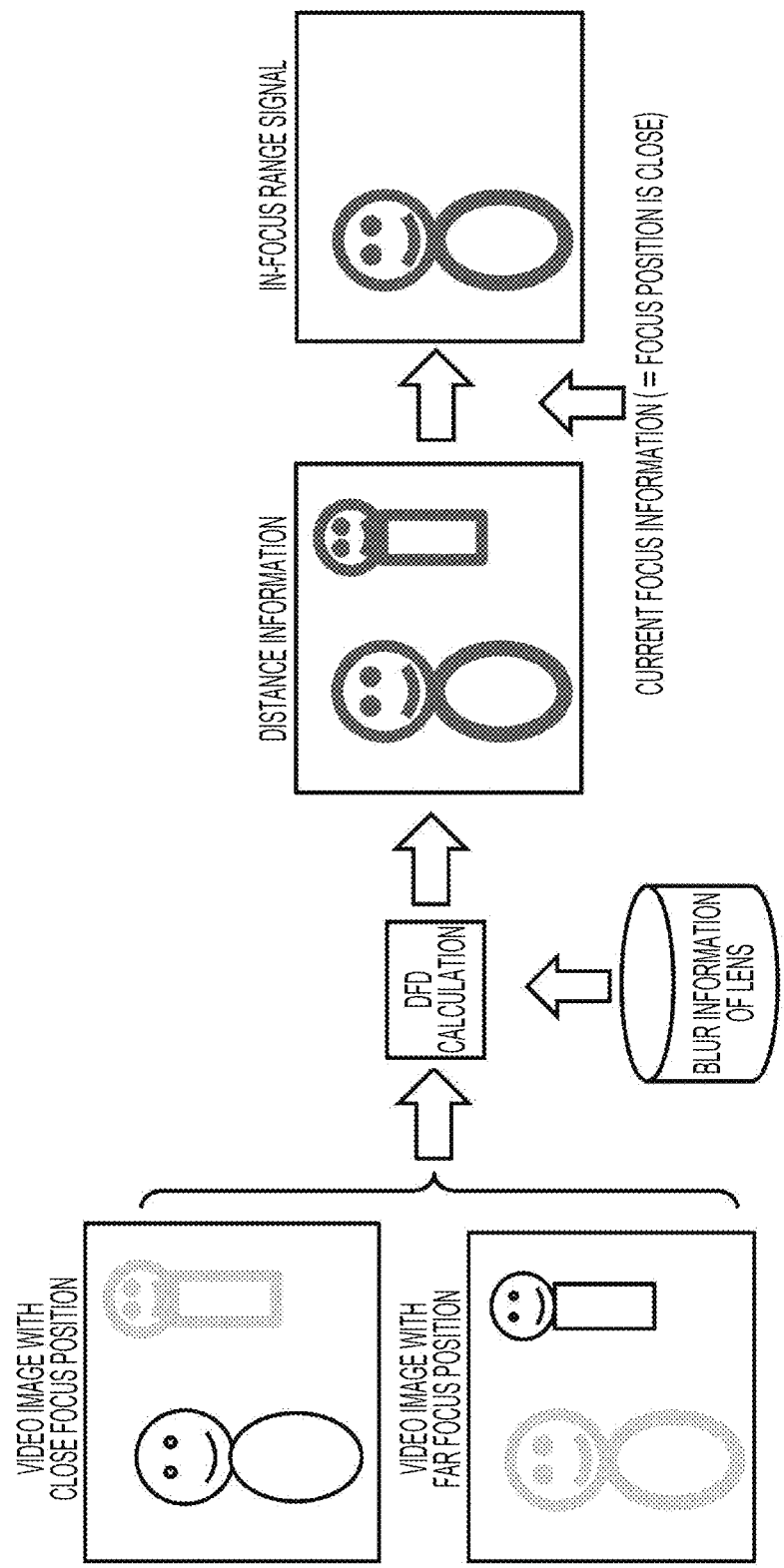
FIG. 3 is a schematic diagram for describing an operation of a distance information calculator of the image pickup apparatus in the first exemplary embodiment of the present disclosure.

A description is given on a case where two dolls located in places at different distances are being imaged. The rectangular-bodied doll on the right side of a screen when viewed by a photographing person seeing the screen of display 105 is placed at a distance far from image pickup apparatus 100. The ellipsoidal-bodied doll on the left side of the screen when viewed by a photographing person seeing the screen of display 105 is placed at a distance close to image pickup apparatus 100. Assume a case where a focus position has been moved from the doll placed far from image pickup apparatus 100 to the doll placed close to image pickup apparatus 100. With reference to FIG. 3, the focused doll is depicted by black lines, and the defocused doll is depicted by bold gray lines. In the diagram represented by "video image with far focus position", the doll on the right side of the screen is focused, and the doll on the left side of the screen is defocused. In the diagram represented by "video image with close focus position", the doll on the right side of the screen is defocused, and the doll on the left side of the screen is focused. Currently, the video image with the close focus position is displayed.

A description will be given on a process of generating a focus-assist-signal-added video signal at this time with reference to FIG. 3 to FIG. 5.

FIG. 3 is a schematic diagram for describing an operation of distance information calculator 5 of image pickup apparatus 100 in the first exemplary embodiment of the present disclosure.

The calculation according to the DFD needs two or more video signals at different focus positions, focus information on each of the video signals, and blur information of the lens. The video signals when the focus position has been moved from a far position to a close position are constantly input to memory circuit 4 and are appropriately stored. Distance information is calculated, when the DFD calculation is performed on the basis of two video images stored in memory circuit 4 and a previously stored blur information of the lens, where one of the images is the former video image at a far focus position and the other of the images is the current video image at a close focus position. With reference to the diagram represented by "distance information" in FIG. 3, a region in which the ellipsoidal-bodied doll on the left side of the screen is present represents a region which is at a close distance from image pickup apparatus 100, and a region in which the rectangular-bodied doll on the right side of the screen is present represents a region which is at a far distance from image pickup apparatus 100. It is possible to determine the region in focus in the current video image, from the current focus information and the distance information. The region in focus is the region in which the in-focus range signal is depicted in black in the right block in FIG. 3. In this manner, distance information calculator 5 outputs the in-focus range signal.

Figure 4:
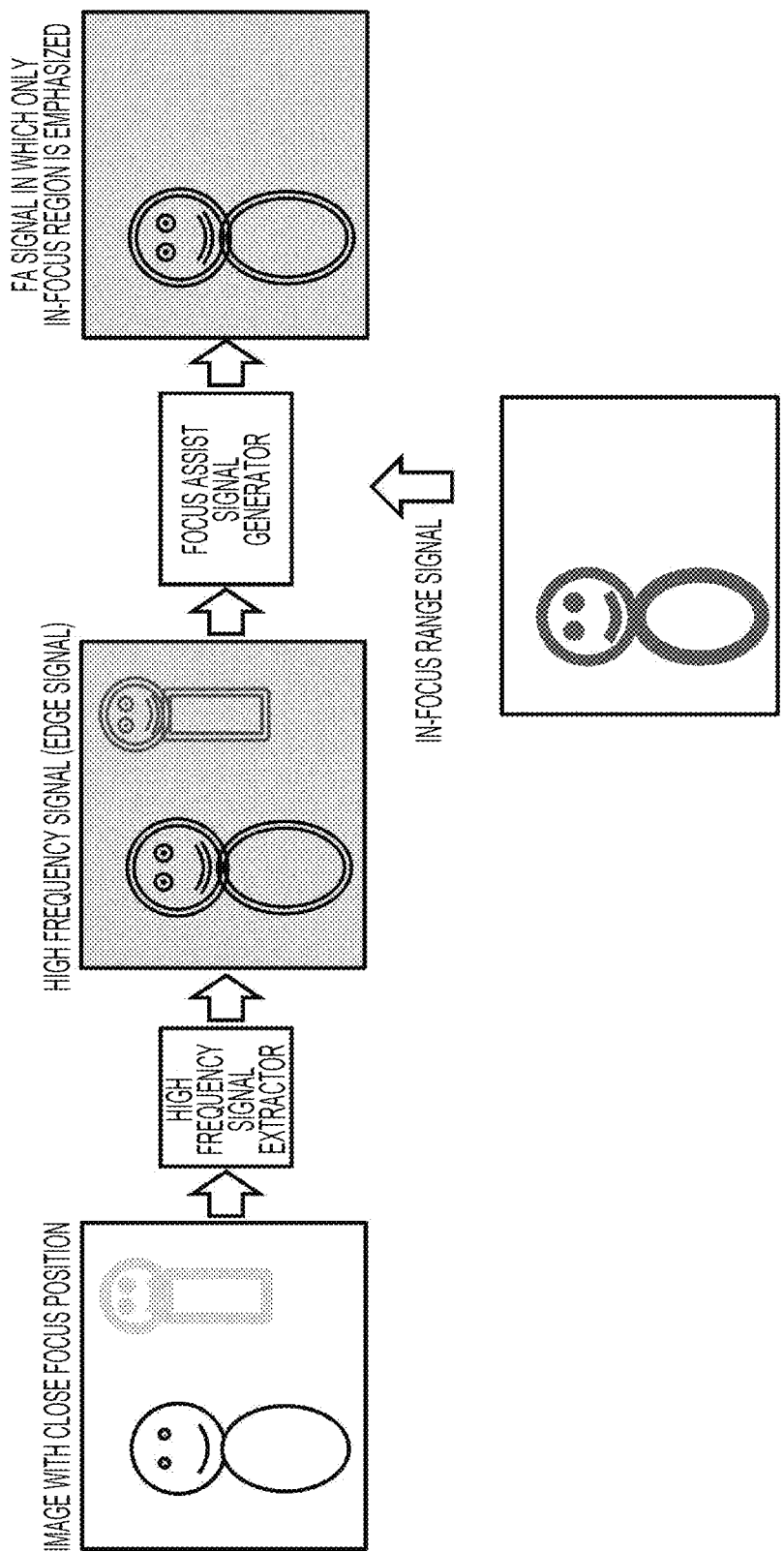
FIG. 4 is a schematic diagram for describing a process of generating a focus assist signal in which only a focused region is emphasized in the image pickup apparatus in the first exemplary embodiment of the present disclosure.

FIG. 4 is a schematic diagram for describing a process of generating a focus assist signal in which only the in-focus region is emphasized in image pickup apparatus 100 in the first exemplary embodiment of the present disclosure. With reference to FIG. 4, a description will be given on the generation operation of a focus assist signal which emphasizes only the in-focus region.

High frequency signal extractor 1 performs high-pass filter processing to extract a high frequency signal of a video signal.

Since the current video signal is a video image with a close focus position, the doll on the left side of the screen is focused, and the doll on the right side of the screen is defocused. Since the high frequency signal of the video image increases as the focusing is getting more accurate, when video image is subjected to high-pass filter processing, a signal is obtained in which the edge parts of the doll on the left side of the screen are extracted as shown in the diagram represented by "high frequency signal (edge signal)" of FIG. 4. However, the high frequency signal is also affected by a pictorial pattern largely, and in the case where a pictorial pattern has a high contrast, even if focus is slightly out, a signal is also detected in which the edge part of the doll on the right side of the screen is extracted as shown in the diagram of "edge signal" of FIG. 4.

Focus assist signal generator 2 extracts, from the high frequency signal, an edge signal only in an in-focus range by using the in-focus range signal from distance information calculator 5, and generates the focus assist signal (FA signal) in which only the in-focus region is emphasized. In FIG. 4, as a way of emphasizing, a signal is generated in which a high frequency signal part in the focused region is depicted by double lines.

Note that the way to emphasize is not limited to a double line but may be color conversion to red or blue, and alternatively, any way to emphasize may be used as long as a high frequency signal extracted by using an in-focus range signal is used.

Figure 5:
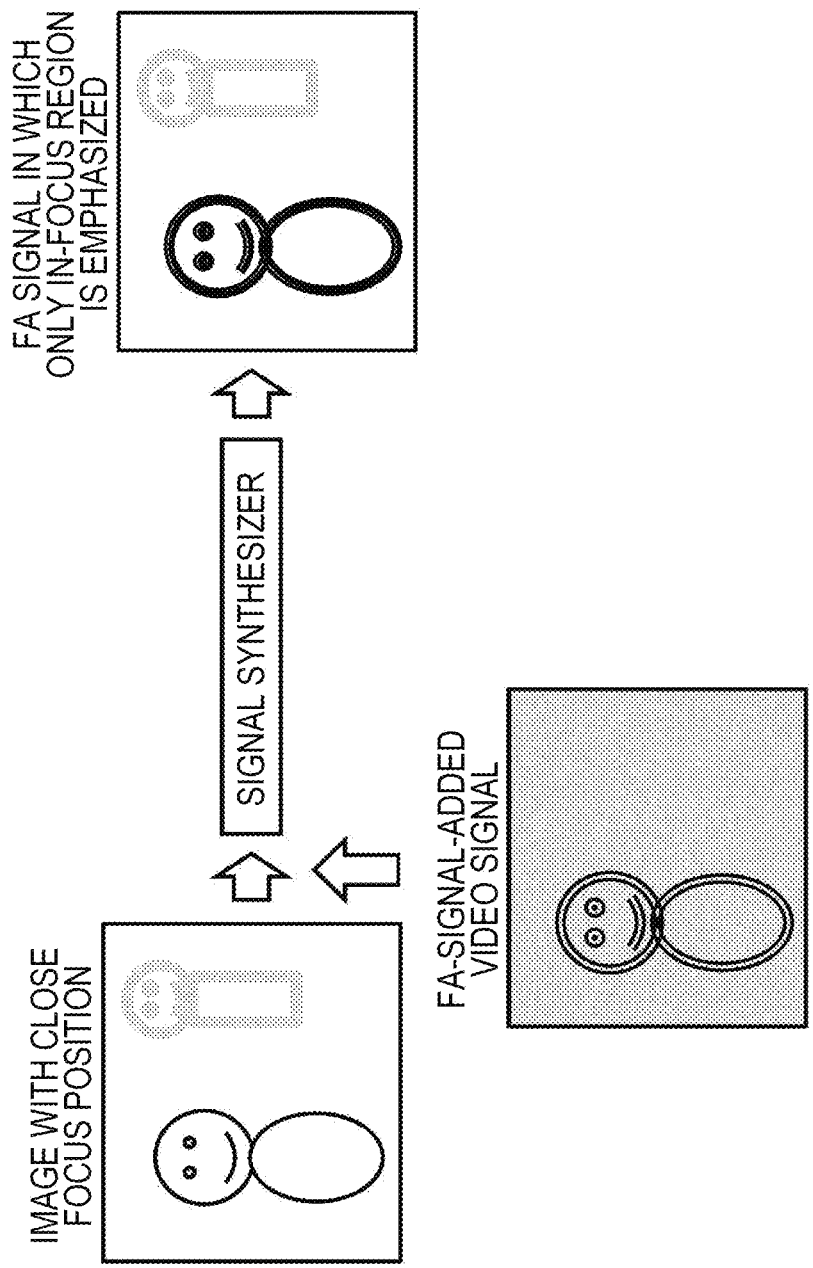
FIG. 5 is a schematic diagram for describing a process of generating a focus-assist-signal-added video signal in the image pickup apparatus in the first exemplary embodiment of the present disclosure.

FIG. 5 is a schematic diagram describing a process of generating a focus-assist-signal-added video signal in image pickup apparatus 100 in the first exemplary embodiment of the present disclosure.

Since the focus assist signal in which only the in-focus region is emphasized is already generated as described above with reference to FIG. 4, the focus-assist-signal-added video signal is generated by synthesizing the focus assist signal with the original video signal.

Note that the method for synthesizing can be addition, substitution, or other manners.

1-3. Advantageous Effect and the Like

As described above, in the present exemplary embodiment, image pickup apparatus 100 is equipped with distance information calculator 5, high frequency signal extractor 1, focus assist signal generator 2, and signal synthesizer 3. Distance information calculator 5 calculates distance information of a video signal and then generates an in-focus range signal from current focus information and the distance information. High frequency signal extractor 1 extracts a high frequency signal of the video signal. Focus assist signal generator 2 uses the high frequency signal and the in-focus range signal to generate a focus assist signal representing a focused region. Signal synthesizer 3 synthesizes the focus assist signal with the video signal to generate a focus-assist-signal-added video signal.

This arrangement enables to synthesize a focus assist signal in which only a region in focus is emphasized. Therefore, an accurate focus operation is possible.

Further, in the present exemplary embodiment, image pickup apparatus 100 generates a focus assist signal on the basis of a high frequency signal of a video signal.

With this arrangement, a generated focus-assist-signal-added video signal is a high definition video signal. Therefore, it is possible to perform a focus operation with no feeling of strangeness.

Second Exemplary Embodiment

A second exemplary embodiment is different from the first exemplary embodiment in the following points: a video image region is divided into block-like shapes; distance information is selectively calculated only at representative points; interpolation is performed from the distance information only at the representative points to generate an in-focus range signal which is to be applied to the whole of the video image. Hereinafter, the second exemplary embodiment will be described mainly about the parts different from the first exemplary embodiment with reference to FIG. 6 to FIG. 8.

2-1. Configuration

Figure 6:
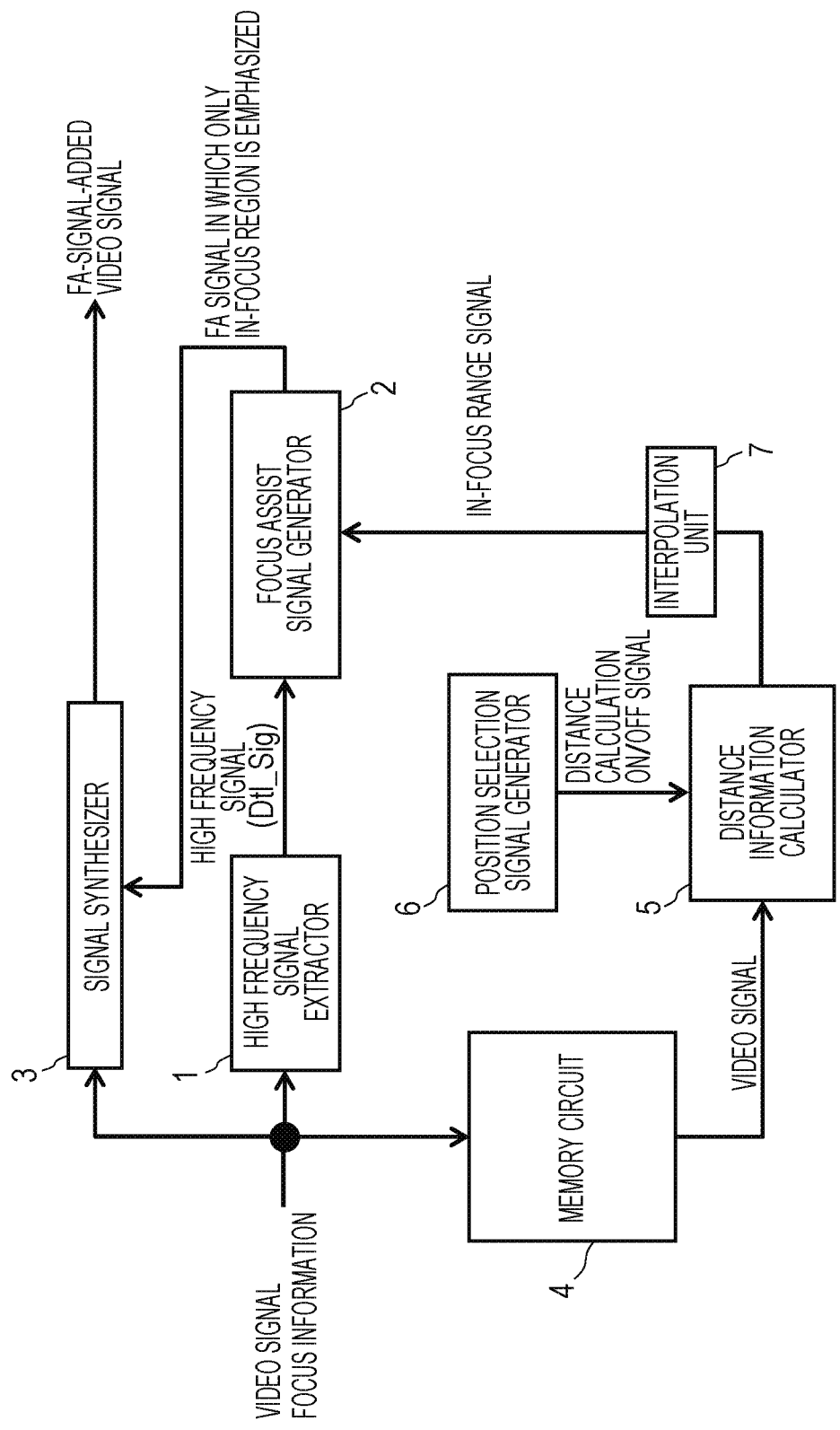
FIG. 6 is a block diagram showing a configuration related to image processing of an image pickup apparatus in a second exemplary embodiment of the present disclosure.

FIG. 6 is a block diagram showing a configuration related to image processing of image pickup apparatus 100 in the second exemplary embodiment of the present disclosure. In FIG. 6, the same components as in FIG. 2 are assigned the same reference numerals.

Image pickup apparatus 100 in the second exemplary embodiment is further equipped with position selection signal generator 6 and interpolation unit 7.

Position selection signal generator 6 divides a video image region into block-like shapes and generates a distance calculation ON/OFF signal so as to selectively calculate only on representative points.

Interpolation unit 7 interpolates such that the result of the calculation on the representative points are applied to the whole blocks made by dividing the video image region.

2-2. Operation

Hereinafter, a description will be given on an operation of image pickup apparatus 100 configured as described above.

Figure 7:
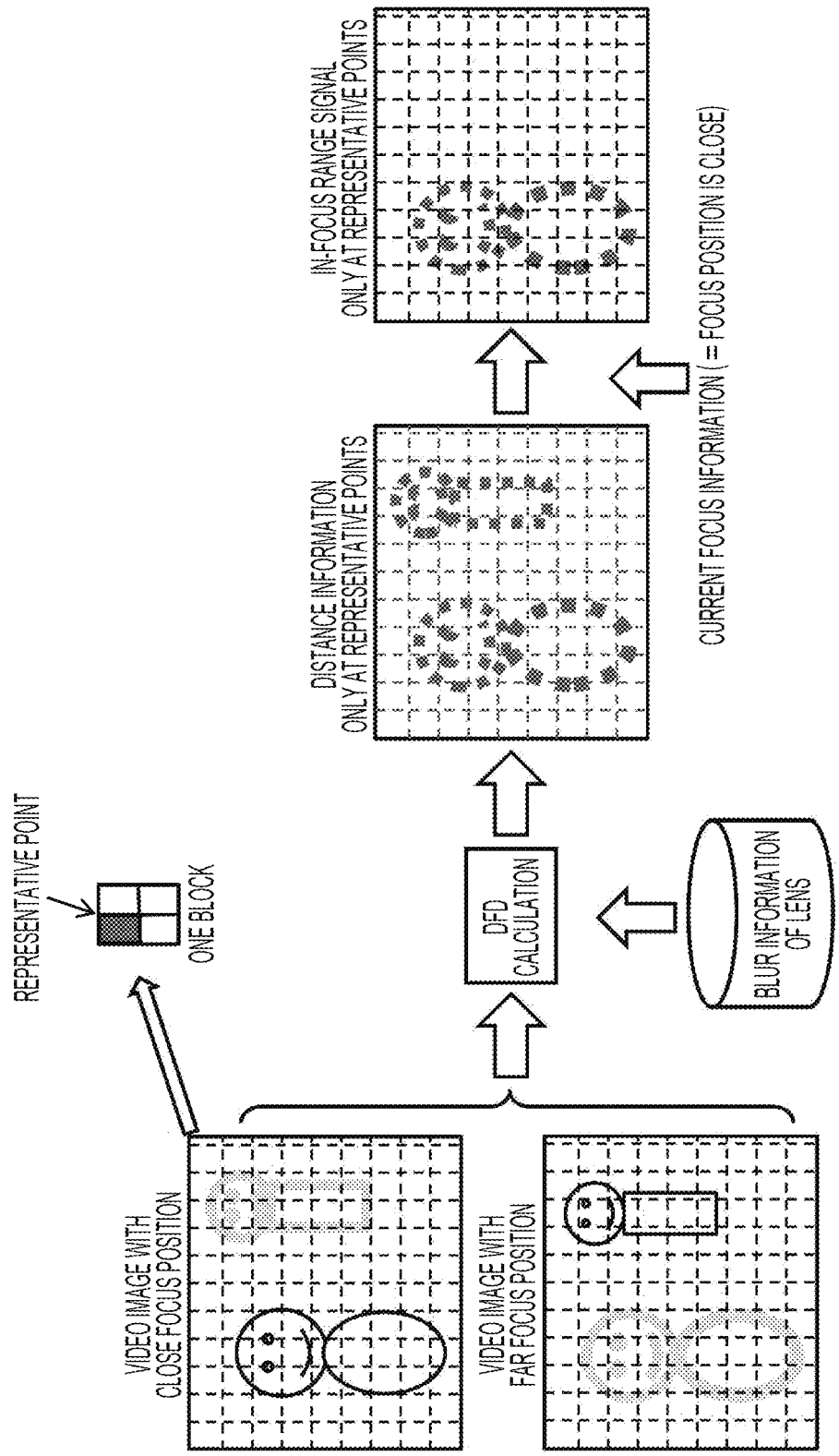
FIG. 7 is a schematic diagram for describing an operation of a distance information calculator in a case where calculation is performed only at representative points in the image pickup apparatus in the second exemplary embodiment of the present disclosure.

FIG. 7 is a schematic diagram for describing an operation of distance information calculator 5 in a case where calculation is performed only on representative points in image pickup apparatus 100 in the second exemplary embodiment of the present disclosure.

In a similar way to the first exemplary embodiment, a description is given on the case where two dolls located in places at different distances from image pickup apparatus 100 are being imaged. The rectangular-bodied doll on the right side of a screen is placed at a distance far from image pickup apparatus 100, and the ellipsoidal-bodied doll on the left side of the screen is placed at a distance close to image pickup apparatus 100. Assume a case where a focus position has been moved from the far doll to the close doll.

Figure 8:
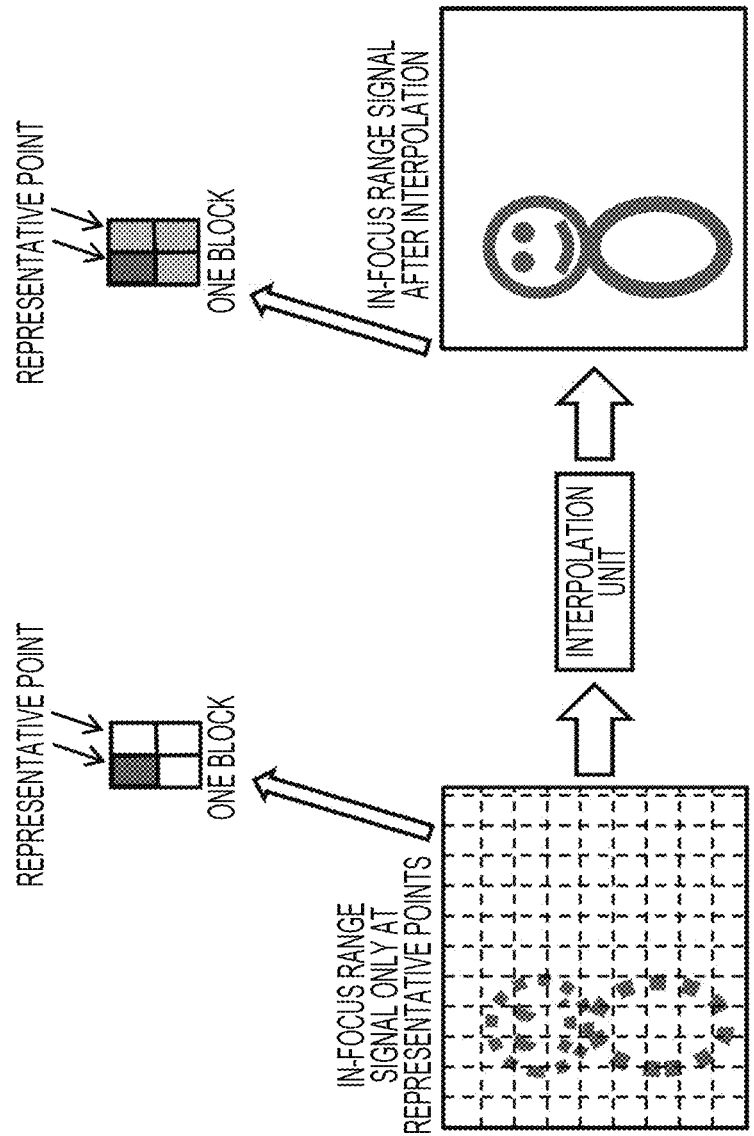
FIG. 8 is a schematic diagram for describing an operation of an interpolation unit in a case where calculation is performed only at representative points in the image pickup apparatus in the second exemplary embodiment of the present disclosure.

With reference to FIG. 7 and FIG. 8, a description will be given on a process of generating an in-focus range signal of the whole video signal in this case.

In FIG. 7, the video image region is divided into blocks each of which is constituted by 2×2 pixels, and the upper-left pixel of each block is a representative point. That is, in the block constituted by 2×2 pixels, distance information is calculated only with respect to the upper-left pixel. Further, similarly to the first exemplary embodiment, a focused region is determined with respect to a current video image by using current focus information, and only an upper-left in-focus range signal is output with respect to the 2×2 pixel block.

FIG. 8 is a schematic diagram for describing an operation of interpolation unit 7 in a case where calculation is performed only on the representative points in the image pickup apparatus in the second exemplary embodiment of the present disclosure.

From the in-focus range signal at the representative point, the in-focus range signal for the rest of the pixel region of the block is generated by interpolation processing. In FIG. 8, the in-focus range signal on the representative point is output as it is as the in-focus range signal for the rest of the pixel region of the block.

The in-focus range signal of the whole video signal is used to determine an in-focus region similarly to the first exemplary embodiment.

Note that the regions of the blocks into which the video image region is divided do not have to be 2×2 pixel regions and may be made of 4×4 pixels or 8×4 pixels.

Note that the representative point of the region divided to be a block does not have to be the upper-left pixel.

Note that the method of interpolation may be any interpolation method, and for example, calculation may be performed by linear interpolation processing from the in-focus range signal in the surrounding representative points.

With regard to an order of interpolation processing, the distance information only at the representative points may be subjected to interpolation processing to calculate the distance information of the whole video signal, and then the in-focus range signal may be calculated on the basis of the current focus information.

Since high frequency signal extractor 1, focus assist signal generator 2, and signal synthesizer 3 operate similarly to the first exemplary embodiment, a description thereof is skipped.

2-3. Advantageous Effect and the Like

As described above, in the present exemplary embodiment, image pickup apparatus 100 may be further equipped with position selection signal generator 6 and interpolation unit 7. Position selection signal generator 6 divides the video image region into block shaped regions and generates a distance calculation ON/OFF signal such that calculation is performed on the representative points of the divided block shaped regions. Interpolation unit 7 obtains the in-focus range signal for all of the regions according to the signal which has been output by position selection signal generator 6.

This arrangement can reduce a calculation amount of calculating the distance information. Thus, it is possible to reduce one of or both of a power consumption and a size of the circuit.

Further, when the calculation amount is smaller, the calculation is finished sooner, and a delay of the video image of image pickup apparatus 100 can be smaller.

Third Exemplary Embodiment

In a third exemplary embodiment, a near-edge region is determined from a video image region, and distance information is selectively calculated in the near-edge region. In a region determined not to be the near-edge region, a focus-assist-signal-added video signal is generated by using an in-focus range signal which is forced to represent a defocused range. In the above points, the first exemplary embodiment and the second exemplary embodiment are different. Hereinafter, the third exemplary embodiment will be described with reference to FIG. 9 to FIG. 12 mainly about the parts different from the first exemplary embodiment or the second exemplary embodiment.

3-1. Configuration

Figure 9:
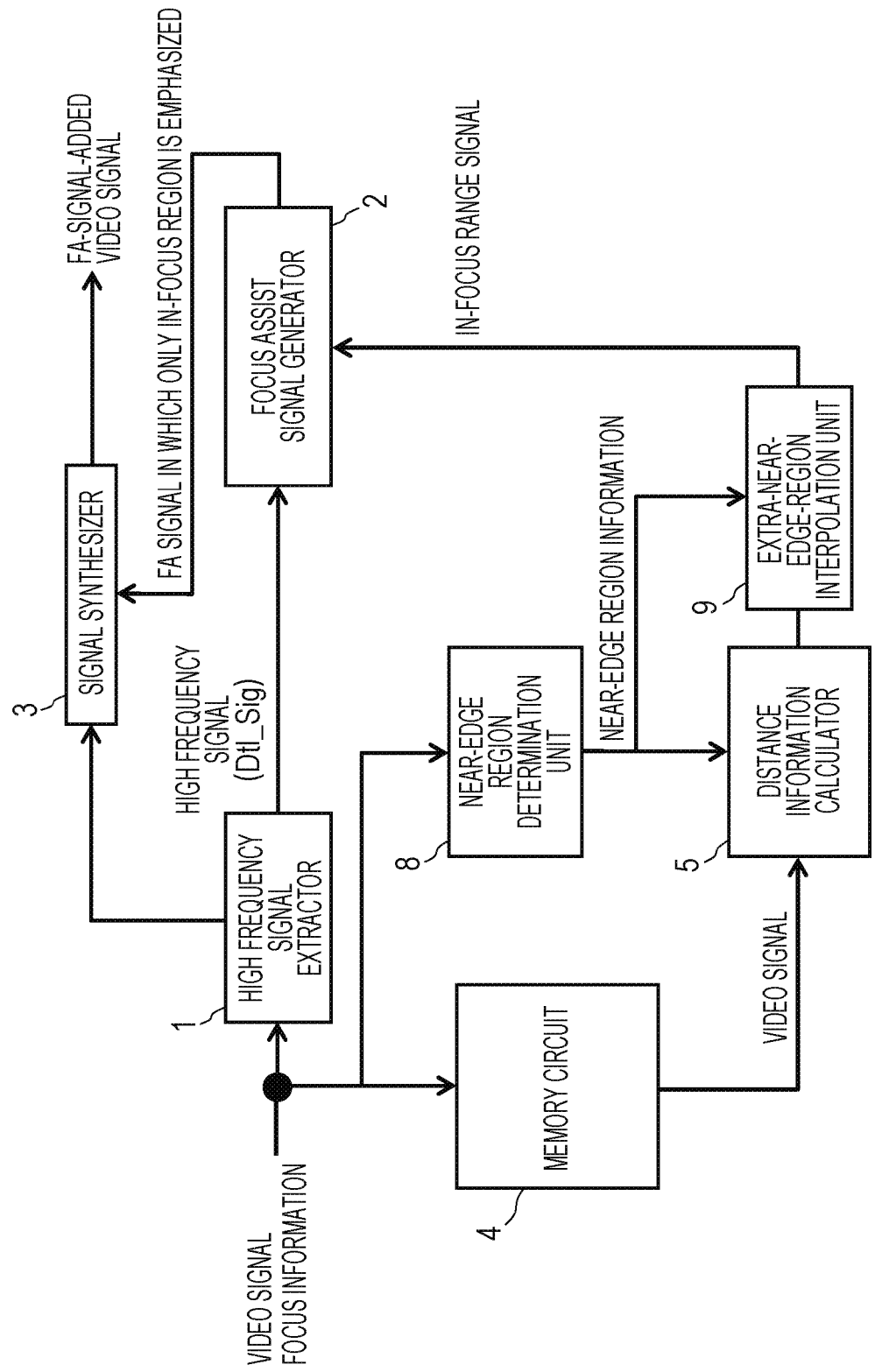
FIG. 9 is a block diagram showing a configuration related to image processing of an image pickup apparatus in a third exemplary embodiment of the present disclosure.

FIG. 9 is a block diagram showing a configuration related to image processing of image pickup apparatus 100 in the third exemplary embodiment of the present disclosure. In FIG. 9, the same components as in FIG. 2 and FIG. 6 are assigned the same reference numerals.

Image pickup apparatus 100 in the third exemplary embodiment is further equipped with near-edge region determination unit 8 and extra-near-edge-region interpolation unit 9, in addition to the components of the first exemplary embodiment shown in FIG. 2.

Near-edge region determination unit 8 determines a near-edge region in a video image region and generates near-edge region information so as to selectively calculate distance information only in the near-edge region. As a method for determining a near-edge region, a method may be taken in which pixels are determined to be a near-edge region, where an amount of change in a brightness level of the pixels on a vertical or a lateral line of pixels is equal to or greater than a predetermined level.

Extra-near-edge-region interpolation unit 9 forces the in-focus range signal for the region which is not in the vicinity of an edge to represent defocus.

3-2. Operation

An operation of image pickup apparatus 100 configured as described above will be described.

In a similar way to the first exemplary embodiment, a description is given on a case where two dolls located in places at different distances are being imaged. The rectangular-bodied doll on the right side of a screen is placed at a distance far from image pickup apparatus 100, and the ellipsoidal-bodied doll on the left side of the screen is placed at a distance close to image pickup apparatus 100. Assume a case where a focus position is moved from the far doll to the close doll.

A description will be given on a process of generating an in-focus range signal of the whole video signal with reference to FIG. 10 to FIG. 12.

FIG. 10 is a schematic diagram for describing an operation of determining a near-edge region in the image pickup apparatus of the third exemplary embodiment of the present disclosure.

Near-edge region determination unit 8 performs high-pass filter processing on the video signal to extract an edge signal. Since the high-pass filter processing detects the amount of change of the video signal, the signal level changes at an edge part of the video image, and the signal level is almost constant in a flat region other than the edge. The reason why the signal level is not perfectly constant on the flat region is that there is a slight noise, an unevenness in color, or the like. Near-edge region determination unit 8 determines whether a pixel is a near-edge region or not, by determining the level of the edge signal while considering a noise component included in the video signal.

Note that the method for determining the near-edge region is not limited to the above method. For example, in order to stabilize the determination result, it is also possible to add contraction processing, expansion processing, noise reduction processing, or the like. Further, it is also possible to define as the near-edge region the area within a predetermined number of pixels, for example 10 pixels, from the edge obtained by the above method.

FIG. 11 is a schematic diagram for describing an operation of calculating distance information only in the near-edge region in the image pickup apparatus in the third exemplary embodiment of the present disclosure.

The distance information is calculated only in the near-edge region on the basis of the near-edge region information. Therefore, in the diagram represented by "distance information only in near-edge region" shown in FIG. 11, the region other than the near-edge region (the region is in gray) is the region in which the distance information is not calculated, and the part in the vicinity of the edge of the ellipsoidal-bodied doll on the left side of the screen is the region at a distance close to image pickup apparatus 100, and the part in the vicinity of the edge of the rectangular-bodied doll on the right side of the screen is the region at a distance far from image pickup apparatus 100. On the basis of the above distance information only in near-edge region and the current focus information, the in-focus range is determined. As a result, the in-focus range signal only in the near-edge region is obtained. The whole video image is recognized as a black focused region, a white defocused region, and a gray uncalculated region.

FIG. 12 is a schematic diagram for describing a process of interpolating the in-focus range signal of the outside of the near-edge region in the image pickup apparatus in the third exemplary embodiment of the present disclosure. For the uncalculated region depicted by gray, in other words, for the region other than the near-edge region, the in-focus range signal is output being forcedly made to be an in-focus range signal of a defocused region; thus, the in-focus range signal for the whole video image displayed on the screen of display 105 is obtained.

The in-focus range signal of the whole video signal is used to determine an in-focus region similarly to the first exemplary embodiment.

Note that an order to interpolate the in-focus range signal outside the near-edge region may be just after the calculation of the distance information in the near-edge region.

Since high frequency signal extractor 1, focus assist signal generator 2, and signal synthesizer 3 operate similarly to the first exemplary embodiment, a description thereof is skipped.

3-3. Advantageous Effect and the Like

As described above, in the present exemplary embodiment, image pickup apparatus 100 may be further equipped with near-edge region determination unit 8 and extra-near-edge-region interpolation unit 9. Near-edge region determination unit 8 determines a near-edge region of the video signal. Extra-near-edge-region interpolation unit 9 calculates distance information only in a near-edge region determined by near-edge region determination unit 8, and performs interpolation for the outside of the near-edge region, taking the outside of the near-edge region as a defocused range.

This arrangement can reduce a calculation amount of calculating the distance information. Thus, it is possible to reduce one of or both of a power consumption and a size of the circuit.

When the calculation amount is smaller, the calculation is finished sooner, and a delay of the video image of image pickup apparatus 100 can be smaller.

Further, it is possible to prevent the in-focus range signal from making a block-like shape, and a high definition in-focus range signal can thus be obtained. Therefore, it is possible to perform a focus operation with no feeling of strangeness.

Other Exemplary Embodiments

As examples of the technology in the present disclosure, the first to third exemplary embodiments are described above. However, the technology in the present disclosure is not limited to the above exemplary embodiments but can apply to an exemplary embodiment in which modification, replacement, addition, removal, or the like is made. Further, it is possible to make a new exemplary embodiment by combining the components described in the above first to third exemplary embodiments.

Hereinafter, other exemplary embodiments will be exemplified.

In the first to third exemplary embodiments, high-pass filter processing is used as an example of the high frequency signal extractor. The high frequency signal extractor does not need to be a high-pass filter and may be any component which extracts a high frequency component of the video signal. Therefore, the high frequency signal extractor is not limited to a high-pass filter. In addition to the high-pass filter processing, it is possible to add noise reduction processing, contraction processing, expansion processing, or the like.

Note that, in the first to third exemplary embodiments, the DFD (Depth From Defocus) technology is used as an example of the distance information calculator. However, the distance information calculator may be any component as long as the component calculates distance information of the video signal. Therefore, the distance information calculator is not limited to processing which uses the DFD technology. For example, a phase difference detection method may be used. Specifically, an in-focus range signal is obtained on the basis of the positional relationship between two images which are formed by dividing a light beam having passed through a lens into two beams and project the two beams and by receiving the two light beams passing through different paths (for example, the right side and the left side of a lens). Alternatively, as a means to realize a phase difference detection method, an imaging element may be used which is configured such that photo diodes for detecting a phase difference are embedded in the imaging element.

Note that since the above exemplary embodiments are for exemplifying the technology in the present disclosure, various modifications, replacements, additions, removals, or the like can be made without departing from the scope of the accompanying claims or the equivalent thereof.

The present disclosure can be applied to an image pickup apparatus in which a manual focusing operation is performed. Specifically, the present disclosure can be applied to a digital camera, a movie camera, a commercial video camera, a portable telephone with a camera function, a smartphone, and the like.

What is claimed is:

1. An image pickup apparatus comprising:
a distance information calculator which calculates distance information of a video signal and generates an in-focus range signal from current focus information and the distance information;
a high frequency signal extractor which extracts a high frequency signal of the video signal;
a focus assist signal generator which generates a focus assist signal representing a focused region, by using the high frequency signal and the in-focus range signal; and
a signal synthesizer which synthesizes the focus assist signal with the video signal to generate a focus-assist-signal-added video signal;
a position selection signal generator which divides a video image region into block shaped regions and generate a distance calculation ON/OFF signal such that calculation is performed on representative points of the divided block shaped regions; and
an interpolator which interpolates interpolate the distance information to obtain an in-focus range signal for all of the regions, in accordance with the generated distance calculation ON/OFF signal.

2. The image pickup apparatus according to claim 1, wherein the distance information calculator calculates the distance information from the video signal imaged at different focus positions and information of a current focus position.

3. An image pickup apparatus comprising:
a distance information calculator which calculates distance information of a video signal and generates an in-focus range signal from current focus information and the distance information,
a high frequency signal extraction which extracts a high frequency signal of the video signal;
a focus assist signal generator which generates a focus assist signal representing a focused region, by using the high frequency signal and the in-focus range signal; and
a signal synthesizer which synthesizes the focus assist signal with the video signal to generate a focus-assist-signal-added video signal;
a near-edge region determinator which determines a near-edge region of the video signal; and
an extra-near-edge-region interpolator which calculates the distance information only in the near-edge region determined by the near-edge region determinator and performs interpolation taking an outside of the near-edge region as a defocused range.

4. The image pickup apparatus according to claim 3, wherein the distance information calculator calculates the distance information from the video signal imaged at different focus positions and information of a current focus position.

* * * * *